United States Patent
Evans et al.

(10) Patent No.: US 9,586,284 B2
(45) Date of Patent: Mar. 7, 2017

(54) PURGE DAM AND METHOD OF USE

(71) Applicants: Coke Evans, Portland, OR (US); Ralph M. Cohen, Portland, OR (US); Richard Bottorff, Portland, OR (US)

(72) Inventors: Coke Evans, Portland, OR (US); Ralph M. Cohen, Portland, OR (US); Richard Bottorff, Portland, OR (US)

( * ) Notice: Subject to any disclaimer, the term of this patent is extended or adjusted under 35 U.S.C. 154(b) by 0 days.

(21) Appl. No.: 14/489,333

(22) Filed: Sep. 17, 2014

(65) Prior Publication Data

US 2016/0074955 A1    Mar. 17, 2016

(51) Int. Cl.
  *B23K 31/02*   (2006.01)
  *B23K 9/32*    (2006.01)
(52) U.S. Cl.
  CPC .................................... *B23K 9/326* (2013.01)
(58) Field of Classification Search
  None
  See application file for complete search history.

(56) References Cited

U.S. PATENT DOCUMENTS

| | | | | |
|---|---|---|---|---|
| 2,805,315 A | * | 9/1957 | Chapman | B23K 13/00 219/104 |
| 3,095,844 A | * | 7/1963 | Thielsch | B23K 9/325 137/561 R |
| 3,194,466 A | * | 7/1965 | Davis | B23K 9/325 138/90 |
| 3,338,499 A | * | 8/1967 | Gilbert | B23K 9/325 138/89 |
| 3,684,856 A | * | 8/1972 | Lifshits | B23K 11/0935 219/100 |
| 3,736,400 A | * | 5/1973 | Spiegel | B23K 9/325 219/137 R |
| 4,101,067 A | * | 7/1978 | Sloan | B23K 37/003 219/136 |
| 4,415,114 A | * | 11/1983 | Hallenbeck | B23K 9/326 228/219 |
| 4,712,720 A | * | 12/1987 | Tesch | B23B 31/20 228/219 |

(Continued)

FOREIGN PATENT DOCUMENTS

| EP | 0116687 A1 | 8/1984 |
| EP | 0795371 A1 * | 9/1997 ............ B23K 9/325 |

(Continued)

*Primary Examiner* — Kiley Stoner
(74) *Attorney, Agent, or Firm* — Lowe Graham Jones PLLC

(57) ABSTRACT

A purge dam assembly confines a volume within an assembly of pipes, including a distal pipe and a proximal pipe together arranged for butt welding at a seam. A distal disk is covered at its periphery with a distal bootie including gasketing material. A proximal disk is covered at its periphery with a proximal bootie including the gasketing material. The each disk is sized such that the bootie contacts but does not completely seal against an inner surface of one of the tubes or pipes permitting a purging flow of gas from the volume and past each disk. A cross-member having a proximal and a distal end, the proximal end is affixed to the proximal disk and the distal end is affixed to the distal disk to preserve the spatial separation between the proximal disk and distal disks and to maintain the proximal and distal disks in coaxial alignment.

17 Claims, 9 Drawing Sheets

(56) References Cited

U.S. PATENT DOCUMENTS

| | | | | |
|---|---|---|---|---|
| 4,723,064 A * | 2/1988 | Bothe, II | ............... | F16L 55/136 219/121.84 |
| 4,757,935 A | 7/1988 | Gugel | | |
| 4,828,160 A * | 5/1989 | Sundholm | ............... | B23K 9/326 219/137.63 |
| 4,875,615 A * | 10/1989 | Savard | ................... | B23K 9/325 138/89 |
| 5,090,608 A * | 2/1992 | Jones | ...................... | F16L 13/02 228/212 |
| 5,100,043 A * | 3/1992 | Hallenbeck | ............ | B23K 9/326 228/219 |
| 5,187,343 A * | 2/1993 | Edwards | ................ | B23K 9/326 138/90 |
| 5,390,846 A * | 2/1995 | Thode | ................... | B23K 9/326 219/74 |
| 5,398,862 A * | 3/1995 | Aleman | ............. | B23K 37/0531 219/74 |
| 5,425,492 A | 6/1995 | Thode | | |
| 5,435,478 A * | 7/1995 | Wood | ................... | B23K 9/0286 219/130.01 |
| 5,501,389 A * | 3/1996 | Muth | ................... | B23K 9/0288 219/121.2 |
| 5,601,225 A | 2/1997 | Wood et al. | | |
| 5,785,235 A * | 7/1998 | Beatty | .................... | B23K 9/325 228/42 |
| 6,435,495 B1 * | 8/2002 | Radbourne | ........ | B23K 37/0435 228/49.3 |
| 7,112,358 B1 * | 9/2006 | Hacikyan | ............... | B23K 9/325 138/89 |
| 7,632,556 B1 * | 12/2009 | Hacikyan | ................ | B23K 9/32 138/89 |
| 7,690,549 B1 * | 4/2010 | Owensby | ............... | B23K 9/235 219/74 |
| 7,810,696 B2 * | 10/2010 | Nunnery | ............ | B23K 37/0531 228/44.5 |
| 8,376,208 B1 * | 2/2013 | McCarthy | ........... | F16L 55/1141 138/89 |
| 8,540,137 B1 * | 9/2013 | Hacikyan | ................ | B23K 9/326 228/219 |
| 8,616,432 B1 * | 12/2013 | Hacikyan | ............. | B23K 9/0061 138/89 |
| 8,647,731 B2 * | 2/2014 | Hacikyan | ................ | B23K 9/32 138/89 |
| 2006/0068142 A1 * | 3/2006 | Hacikyan | ............... | B23K 9/326 428/40.1 |
| 2007/0099713 A1 * | 5/2007 | Campbell | ............... | F16F 9/306 464/180 |
| 2009/0145884 A1 | 6/2009 | Ammann et al. | | |
| 2011/0151166 A1 * | 6/2011 | Hacikyan | ................ | B23K 9/32 428/40.1 |
| 2012/0125975 A1 | 5/2012 | Yanaros et al. | | |
| 2013/0284297 A1 * | 10/2013 | Hacikyan | ............... | B23K 9/326 138/93 |
| 2014/0117068 A1 * | 5/2014 | Hacikyan | ............... | B23K 9/325 228/57 |
| 2014/0326779 A1 * | 11/2014 | Hacikyan | ............... | B23K 9/326 228/42 |
| 2015/0083785 A1 * | 3/2015 | Park | ....................... | B23K 9/326 228/33 |

FOREIGN PATENT DOCUMENTS

| | | | | |
|---|---|---|---|---|
| EP | 1116544 A2 | | 7/2001 | |
| GB | 781317 | | 8/1957 | |
| GB | 1138685 A | * | 1/1969 | ............ B23K 9/325 |
| GB | 2201623 A | * | 9/1988 | ............ B23K 9/326 |
| GB | 2288562 A | * | 10/1995 | ............ B23K 9/325 |
| GB | 2327480 A | * | 1/1999 | ............ B23K 9/325 |
| JP | 60040671 A | * | 3/1985 | |
| KR | 20100009350 A | * | 1/2010 | ............ B23K 9/326 |
| KR | 20100009351 A | * | 1/2010 | ............ B23K 9/326 |

\* cited by examiner the interior at the weld site. Pressing oxygen out of the enclosed volume assures that metal heated to a molten state will not oxidize in the presence of free oxygen, thereby preventing any compromise to the integrity of the weld.
PURGE DAM AND METHOD OF USE

FIELD OF THE INVENTION

The inventive device and method relate to welding technologies and specifically to the method and apparatus for effecting sound welds of readily oxidized metals.

BACKGROUND OF THE INVENTION

A purge dam forms a barrier, within either a pipe or a tube, to form, in cooperation with a second purge dam, each flanking the proposed weld site, thereby enclosing a small volume of the interior of the pipe or tube. Prior to welding, an inert gas is used to "purge" or eliminate oxygen from the interior at the weld site. Pressing oxygen out of the enclosed volume assures that metal heated to a molten state will not oxidize in the presence of free oxygen, thereby preventing any compromise to the integrity of the weld.

As a matter of nomenclature throughout this application, tubes and pipes are different; while this invention applies with equal vigor to each of tubes and pipes, it is the understanding of that the proper nomenclature is selected by application. Generally, pipes accommodate larger applications with sizes that range from a half-inch to several feet. Tubes, on the other hand, are generally used in applications that require smaller diameters. Tubes are often put to use in applications that require precise outside diameters, like with cooler tubes, heat exchanger tubes and boiler tubes. Pipes have a pressure rating and are schedule, which is why they are often used to carry fluids that must be contained. Without exclusion of pipes, the term "tubes" will be used throughout to refer to both of pipes and tubes. No prejudice can be presumed as the inventive purge dam assembly can be applied with equal facility to each of tubes and pipes and the selection of "pipes" is merely to make the claims definite in light of this very similar nomenclature. For purposes of this application, there is no intended distinction between the two terms and in the context of this application the term "pipes" encompasses both, even acknowledging that in the industry, there is a distinction.

The volume confined between the two purge dams is generally kept small to assure the rapid elimination of oxygen behind the weld. Purging by introducing a volume of an inert gas to displace oxygen is a dilution phenomenon. Purge time and the volume of purge gas required are each proportionate to the volume being purged; naturally, the larger the enclosed volume, the greater the volume necessary to displace the oxygen. Acceptable oxygen concentrations vary by industry and application. For example, in one market requiring very high quality welding, the semiconductor and pharmaceutical industry, an oxygen concentration in the volume between the purge dam is required to be as low as approximately one part per million (ppm).

There are several types of purge dams on the market but very few are used in either of the semiconductor and pharmaceutical industry markets where, for example, electropolishing is necessary to remove surface imperfections because such imperfections enhance the risk of contamination. Because conventional purge dams are made of, for example, water soluble paper, the rinsing step used to remove those dams nearly assures the presence of unwanted remnant or residue.

Fastidious and scrupulous care is necessary to exclude sources of contaminants because the tubing system will eventually be conveying gases requiring purity having less than a part per billion or even a part per trillion (ppb or ppt) of contaminants. Even among those other conventional types of purge dams, apart from those formed of soluble paper, such as inflatable cloth dams coated with elastomer, inflatable elastomer dams, or rigid disks with peripheral elastomeric seals, the interior surface of the pipes might suffer some scratching or other disfigurement resulting from the outward pressure the elastomer exerts when sealing. Most elastomers, because of the cost of the pure elastomer resin also contain hard fillers such as carbon or glass that can, also, scratch surfaces. Semiconductor industry standards prevent the use of any of the conventional purge dams; all of the conventional purge dams would either degrade the electropolished inner pipe surface by creating fine scratches or leave dilute residues from the elastomers.

SEMI (Semiconductor Equipment and Materials International) standards provide a general outline for the tubing (material, manufacturing standards), surface properties (cleanliness, roughness), welding methods and quality control, and post weld inspection criteria used by that industry. For example, in the 1995 expression of the grading for surface roughness there are three standards, which for the purposes of explanation will be ranked good, better, and best. For good surfaces, SEMI standards require that no scratch may exceed a depth of greater than 0.3 micrometers, for better, 0.25, and for best 0.18. The averages for each standard with multiple measurements are, for good, 0.25; for better, 0.18, and for best, 0.13. Use of conventional purge dams makes welding product to these specifications impossible. Surface scarring in excess of allowable standards results from elastomer pressure on the interior surface of the pipe.

To help in the understanding of the scale of these defects, consider that a human hair is about 75-100 microns or, alternatively, micrometers, in diameter. In sufficient numbers particles 200 times smaller (0.5 micron) than the human hair can cause major disaster in a cleanroom. Contamination can lead to expensive downtime and increased production costs. In fact, the billion-dollar NASA Hubble Space Telescope was damaged and did not perform as designed because of a particle smaller than 0.5 microns. Elastomers used by conventional means to form purge dams regularly contain particulate far larger in size than the 0.5 microns described herein.

What is lacking in the conventional art is a method and purge dam that can be used without contact between elastomers which might abrade or otherwise scar interior surfaces of pipes. SEMI standards, for one, will not allow conventional means for damming a pipe as the resultant interior surface would be put into a state of roughness that exceeds the standard.

SUMMARY OF THE INVENTION

A purge dam assembly confines a volume within an assembly of pipes, including a distal pipe and a proximal pipe together arranged for butt welding at a seam. A distal disk is covered at its periphery with a distal bootie including gasketing material. A proximal disk is covered at its periphery with a proximal bootie including the gasketing material. The each disk is sized such that the bootie contacts but does not completely seal against an inner surface of one of the tubes or pipes permitting a purging flow of gas from the volume and past each disk. A cross-member having a proximal and a distal end, the proximal end is affixed to the proximal disk and the distal end is affixed to the distal disk to preserve the spatial separation between the proximal disk and distal disks and to maintain the proximal and distal disks in coaxial alignment.

Desired spatial separation is selected as appropriate to confine a volume of gas chosen as suitably efficient for the displacement of oxygen in the context of welding (perfect optimization is not necessary, though suitable selection of a confined volume minimizes loss of expensive purge gases to the ambient atmosphere). The disks are selected to be of a diameter necessary to provide a precise gap between the disk and the diameter of the inner surface of pipe. This selection is to permit insertion and removal of the purge dam after allowing for pipe diameter tolerances. Gasketing material covers the perimeter edge of each disk to impede the flow of purging gas and accelerate the elimination of oxygen from the volume that the disks and interior surface of the pipe defines. When in place, the disks and gasketing material allow for a slow flow past the disks, and out to the ambient atmosphere, thereby facilitating the purge of oxygen by retaining the purge gas and atmospheric gasses at a pressure only slightly elevated from ambient atmospheric pressure.

Importantly, in a presently preferred embodiment of the invention, the gasketing material is selected to comprise a replaceable synthetic pipe (referred to herein as a "sock"). The sock is fabricated from a synthetic material that at least one major manufacturer for SEMI-approved components, itself currently approves for use to clean and dry the pipes after electro-polishing. One example of the synthetic material is selected because it has qualities including an accepted particulate and contaminant concentration and it does not scratch or degrade an electro-polished stainless steel surface.

In another preferred embodiment of the invention, the pipe affixed to the disks to maintain spatial separation is perforated along its length to admit a flow of purging gas into the volume which the disks and interior surface of the pipe define. In some embodiments, the perforated pipe further includes at least one concentric reducer, selected to accelerate purge gas flow toward the distal disk before exiting the dam. Where a second reducer is used, it is placed in opposed relation to the first reducer and is oriented symmetrically to the first reducer thereby lending further integral strength to the pipe where the pipe is affixed one of the two disks. In practice, the perforations that run the length of the pipe are selected to be slotted as it is believed that slotted perforations more optimally disperse the purging gas uniformly throughout the volume that the disks and interior surface of the pipe define. The pipe having slotted perforations is selected to be fabricated from electro-polished stainless steel in such embodiments configured to meet SEMI requirements. However, such a structure is not necessary to conform to the invention as intended, and is merely one of several embodiments the invention comprises.

A further embodiment of the invention includes sensors positioned to allow the in-situ measurement of at least one of oxygen concentration and at least one gas pressure within the volume which the disks and interior surface of the pipe define. By way of non-limiting example, a pressure sensing port is configured to allow installation of a gauge to measure the pressure within the confined volume; in one, such example, by a hose connection thereby providing remote indication on a pressure gauge. In another example, an oxygen sensor consisting of two zirconium dioxide (ZrO2) discs coated with thin porous layers of platinum which serve as electrodes, and would be optimally placed within the volume the disks and interior surface of the pipe define. As a result, the oxygen concentration would be represented by a measured Nernst voltage across the gap that separates the two discs.

A still further embodiment of the invention includes neodymium magnets placed on the periphery of the disks. These neodymium magnets aid in placement of the purge dam within pipes to be welded. A further embodiment of a purge dam system includes a positioning jig having a structure that locates magnets at positions corresponding to those placed in the periphery of the disks, though displaced radially from them sufficiently to admit the pipes to be welded. In such a manner, the jig is placed outside of the pipes to surround the pipes, and by magnetic attraction, to draw the purge dam into suitable position for welding.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
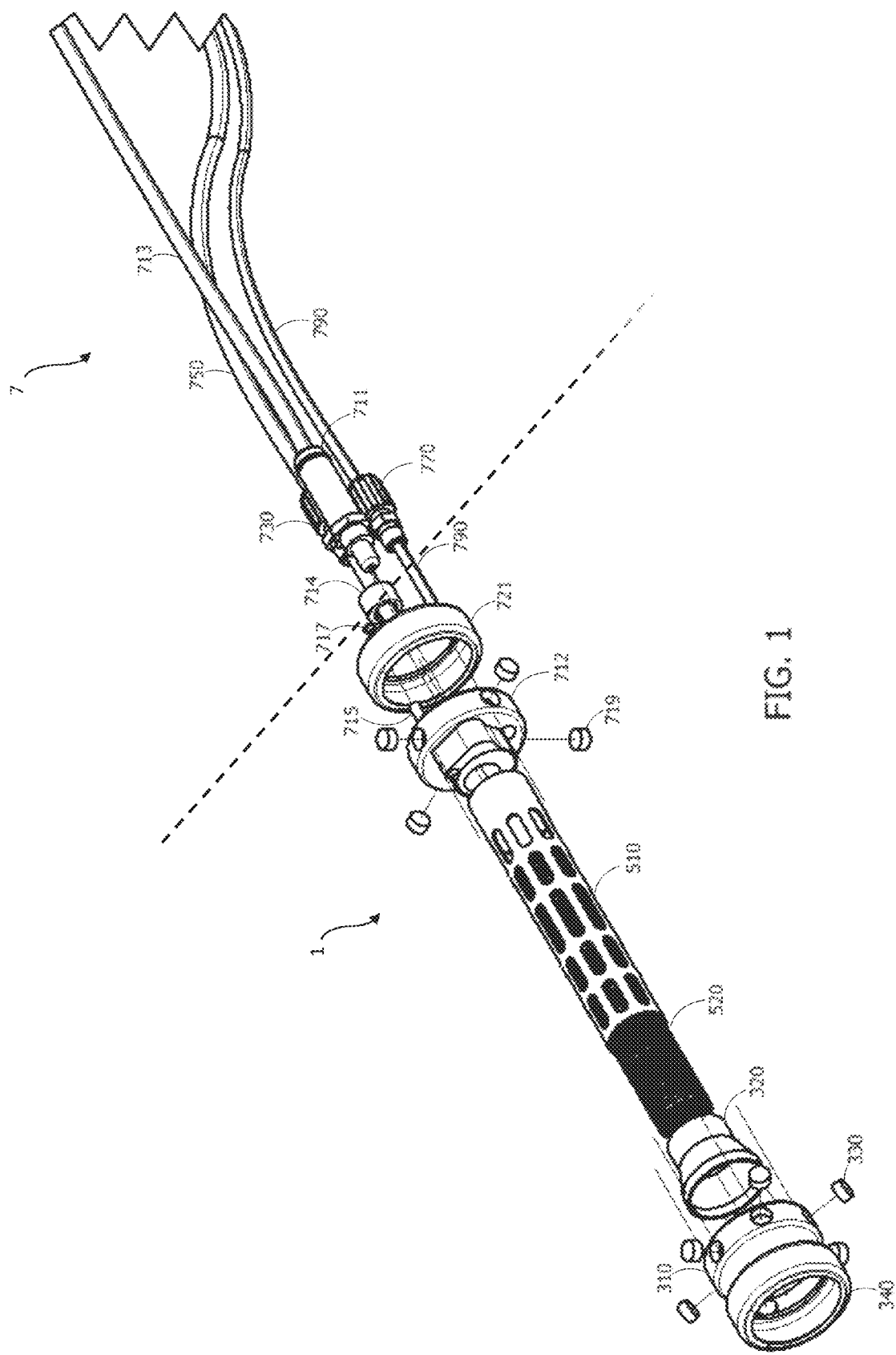
FIG. 1 is an exploded view of an embodiment of an inventive purge dam showing as well optional magnets set in the peripheral rim of the disks.

An embodiment of a purge dam assembly 1 includes stainless steel disks (denoted herein as distal disk 310 and proximal disk 712) affixed to slotted tube 510 to maintain their spatial separation and axial alignment. Desired spatial separation is selected to confine a volume of gas chosen as suitably efficient for the displacement of oxygen in the context of welding (perfect optimization is not necessary, though suitable selection of a confined volume minimizes loss of expensive purge gases to the ambient atmosphere). The disks 310, 712 are selected to be of a diameter to provide a precise gap between disk and an inner surface of pipe. The selection is to permit insertion and removal of the purge dam after allowing for pipe diameter tolerances. Gasketing material covers the perimeter edge of each disk to impede the flow of purging gas and elimination of oxygen from the volume the disks and interior surface of the pipe define. When in place, the disks and gasketing material allow for a slow flow past the disks out to the ambient atmosphere thereby facilitating the purge of oxygen by retaining the purge gas and atmospheric gasses at a pressure only slightly elevated from ambient atmospheric pressure.

Importantly, two socks 340, 721 consisting of gasketing material are selected to comprise a replaceable synthetic tube (referred to herein as a "sock"); the sock is fabricated from a synthetic material SEMI currently approves for use to clean and dry the pipes after electro-polishing. While shown here as formed to receive, respectively, a distally located disk referred to herein as distal disk 310 and a proximally located disk referred to herein as a proximal disk 712.

For purposes of explanation, a convention will be used in describing what is present in the figures based upon the principal location of the proximal disk 712 which differs from the remaining disk, the distal disk 310. The term "distal" shall refer to movement or a location further away from the proximal disk 712, such as in "the distal disk 310 is located distally from the proximal disk 712." The selection of this nomenclature is intuitive, as the purge dam assembly must be inserted into pipes with the distal disk 310 entering first. This orientation in insertion is required as the proximal disk, i.e. the proximal disk 712 is appropriately configured to define ports for admission of the purging gas from the purge gas supply fitting 730 and, in the presently preferred embodiment, for each of an oxygen sensor 711, and a pressure sensing tube 770. The umbilical cord 7 prevents insertion of the purge dam assembly 1 in any orientation except where the distal disk 310 precedes the proximal disk 712 into the pipe assembly 6. The term umbilical cord 7 as used herein relates to the respective supply lines, i.e. the oxygen signal cable 713, the purge gas supply tube 750, and the pressure sensing tube 790. Therefore, the umbilical cord 7 must be located at a root end of the purge dam assembly 1 and the terms "distal" and "proximal" are readily understood such that the distal end of the purge dam assembly 1 is inserted and the proximal end will follow the distal end into the interior of the pipes to be welded.

The proximal disk, itself, defines a port for receiving purge gas from the purge gas supply tube 750 at a purge gas supply fitting 714 let into the proximal disk 712 which, when the purge dam assembly 1 is in position in the pipe assembly 6 can be used to admit purge gas into the volume the interior surface of the pipe defines in cooperation with the proximal disk 712 and the distal disk 310. As such, the purge gas so admitted can displace oxygen within the volume driving it past the distal disk 310 on the distal end and the proximal disk 712 through the gasketing material and finally to the ambient. The proximal disk can also define other portals. For example, in this preferred embodiment, the proximal disk defines the portal to receive the oxygen sensor 711. In alternate embodiment, the proximal disk further defines a portal for a borescope (not pictured) which allows visual or computer examination of welds from the interior of the pipe assembly 6.

A note here is appropriate. The oxygen sensor 711 and its signal cable 713 is shown so as to place the sensor of the presently preferred embodiment in close proximity to the weld site where the pipes 6p and 6d meet. But this application is not limited strictly to just an oxygen sensor 711. Almost any relevant remote sensor will have a similar sensing and cable or fiber optic thread that will need support in order to report on the conditions at the weld. For example, the above-described borescope, an optical device consisting of a rigid or flexible tube with an objective lens on the distal end together by a relay optical system in between, would have the same sensor end and cable-like tube and, in practice would be accommodated in exactly the same manner as the oxygen sensor is here. The obvious advantage of adding a borescope to the purge dam assembly 7 is that an optical system allows an operator or a computer to examine the weld as it is illuminated to form at the objective lens, an image of the weld showing defects in the weld such as its porosity, incomplete penetration, incomplete fusion, undercutting or longitudinal cracking. Thus, like the boroscope, any of a family of sensors consisting of a sensor and a supporting cable-like stem, can be accommodated in exactly the same manner as the oxygen sensor 711 and while the term will be used throughout, oxygen sensor as set forth in this specification ought not to be considered as limited strictly to the oxygen sensor 711, but extends with similar attributes for accommodating the presence of the sensor, to any of these stem-like sensor assemblies, such as the borescope.

Three structures, principally, make up the purge dam assembly 1. The distal distal disk 310, the proximal proximal disk 712 and a cross-member configured to maintain the axial alignment and spatial separation between the distal distal disk 310 and the proximal supply disk 712. In the preferred embodiment, the cross-member shown is the slotted tube 510 affixed to each of the disks 310, 712 allow insertion into pipes for welding. As stated above, the purge dam assembly 1 exploits both disks 310 and 712 to confine a volume of purging gas between them. The slotted tube 510 has, as its principal occupation the structural role of maintaining the spatial separation and axial alignment of the disks 310, 712. All further embodiments overlay onto that architecture as refinements that bolster the disks in their role as "dams" to the purging gas. For example, the slotting on the tube adds to the tube 510 serving as the backbone of the purge dam assembly 1 with the added role of dispersing and diffusing purge gas as it flows from the interior to the exterior of the tube while that gas being generally confined within the pipes and between the disks 310, 712. Configured with the slotted apertures, the slotted tube 510 introduces a turbulence which mixes and diffuses the purge gas in its flow through the purge dam. In a further refinement, a cylindrical screen 520 is inserted within the slotted tube 510 in order to introduce additional turbulence promoting better dispersion and diffusion of the purging gas, preventing pockets of higher concentrations of oxygen from occurring within the volume that purge dam assembly 1 confines within the pipes.

A still further refinement of an embodiment of the purge dam assembly 1 includes a reducer 320 (shown here on the distal end of the slotted tube 510). While one such reducer 320 is shown, alternative embodiments would include a reducer 320 at the proximal end or, in a third embodiment, reducers 320 on both ends in symmetrical disposition. The reducer serves two distinct and otherwise unrelated purposes. As it is an object of the purge dam assembly 1 to confine a volume of gas in the proximity of an intended weld and then to facilitate driving substantially all of the oxygen from the volume the purge dam confines. As such, the presence of the reducer 320 both directs the flow of the gases, oxygen and purge gas, along the interior of the pipes in a laminar flow through the gasket material, and removes some portion of the atmospheric gasses from the confined volume as any oxygen confined within the reducer cannot have any adverse reaction with the molten metal at the weld site. Secondly, the physical or structural rigidity of the purge dam assembly 1 is greatly increased by the interposition of the reducer 320 between the slotted tube 510 and the distal disk 310, thereby protecting the structural integrity of the purge dam assembly 1 each time it is inserted into a pair of pipes to facilitate their end-to-end welding (Similarly for a second reducer at the proximal end of the slotted tube 510 when joined to the proximal disk 712, though not here pictured).

While the differences between the distal disk 310 and the proximal disk 712 have to do with the definition of portals in the proximal disk 712 to allow access to the volume the purge dam assembly 1 confines within the pipes 6p, 6d, on the radial periphery, and in much of their function, the disks 310, 712 are identical. As has been discussed above, the purpose of the purge dam assembly 1 is to define a space within the pipes 6d, 6p that are to be butt welded, and to confine a gas within that space that is low enough in its oxygen concentration that reaction between molten metal and that confined gas will not promote undue oxidization, thereby compromising the integrity of the welds. Naturally, a principal purpose, then of the purge dam assembly 1 is to set up the two walls the distal disk 310 and the proximal disk 712 provide boundaries to confine the gas within the purge dam assembly 1. Thus, the first purpose of the disks 310, 712 relies, in part on the ability to confine the volume of gasses, while allowing, at least some of the gas to escape, thereby removing elemental oxygen from proximity to the weld site. Judicious selection of gasketing material to make up the distal sock 340 and the proximal sock 721 balances the need to vent the gasses to ambient atmosphere and to confine them in the volume between the disks 310, 712.

Considering again the function of the distal sock 340 and the proximal sock 721, which in this preferred embodiment only differ in their location in the purge dam assembly 1; the gasketing material may suitably be a configured suitable synthetic material such as that known as Texwipe™, also having a designation TX1009 having the additional designation AlphaWipe™. AlphaWipe™ is constructed of 100% continuous-filament polyester in a double-knit, no-run interlock pattern having low particle and fiber levels. As a nonlimiting example AlphaWipe™ is one such textile judged appropriate to make up these socks 340, 721 because of the great purity, textile softness, and the lack of embodied particulate of sizes large enough to deface the surfaces of interior surfaces of pipes to exceed suitable roughness limitations.

A cleanroom or clean room is an environment, typically used in manufacturing or scientific research, with a low level of environmental pollutants such as dust, airborne microbes, aerosol particles, and chemical vapors. More accurately, a cleanroom has a controlled level of contamination that is specified by the number of particles per cubic meter at a specified particle size. To give perspective, the ambient air outside in a typical urban environment contains 35,000,000 particles per cubic meter in the size range 0.5 μm and larger in diameter, corresponding to an ISO 9 cleanroom, while an ISO 1 cleanroom allows no particles in that size range and only 12 particles per cubic meter of 0.3 μm and smaller. The presence of particulate is, of course, the source of scratching when pressed into contact with surfaces. For most relevant applications, the textile will be selected to prevent contamination of the cleanroom environment, but only to the extent that it is deemed necessary in the industry in which the purge dam assembly 1 is deployed.

In the presently preferred embodiment, the socks 340, 721 which, as stated above, must have a soft texture for scratch-sensitive surfaces. As used herein, the term "gasketing material" shall refer to any material determined to conform with such requirements as are necessary to manufacture the product for which the purge dam assembly 1 is being used. This might vary from, for example, the pharmaceutical industry to use in the semiconductor industry. In each embodiment, the purposes of the socks 340, 721 are two-fold: first, to prevent introduction of debris or selection of fabric that would scratch the surface of the pipes in which the purge dam assembly 1 is employed; and, second, to vent sufficient gas volume to effect the purging of the volume the purge dam assembly 1 confines within the pipes 6d, 6p. The selection of fabric is measured against these two criteria, alone. The invention is not otherwise limited in the selection of textiles.

While, as described, the purge dam assembly 1, fully performs all of the tasks envisioned for its effective use, there exists a further efficiency that can be derived from its advantageous configuration. Within the periphery of each of the two disks 310 and 712, magnets 330 and 719, respectively, may be optionally set in order to position the purge dam assembly 1 within the pipes to be welded. By use of the magnets for positioning, far greater knowledge as to position of the purge dam assembly 1 is available, and with greater precision than might be known by simple insertion. Such is not to say that use of magnets is required for positioning of the purge dam assembly 1 but rather doing so exploiting the magnets will result in more precise, and, likely, more rapid assembly of pipes than by simple insertion.

Neodymium is a chemical element with the symbol Nd and atomic number 60. It is a soft silvery metal that tarnishes in air. Although neodymium is classed as a "rare earth" metal, it is a fairly common element, no rarer than cobalt, nickel, and copper, and is widely distributed in the Earth's crust. Neodymium is as the free pure element. High-strength neodymium magnetspowerful permanent magnetsare widely used in such products as microphones, professional loudspeakers, in-ear headphones, and computer hard disks, where low magnet mass or volume, or strong magnetic fields are required. In the current embodiment, the use of neodymium magnets is a preferred embodiment of the invention. The presently preferred embodiment includes placement of magnets around the disks at ninety degree intervals.

In practice, it has also proven to be useful to develop an embodiment that exploits a "handedness" of the purge dam assembly 1, meaning that the arrangement of magnets around the periphery of each of the distal disk 310 and the proximal disk 712 ought to aid in automated insertion of the purge dam assembly 1. Such is the embodiment illustrated in FIGS. 2 through 9, though the favored embodiment currently employs magnets placed at ninety degree intervals around the periphery of the disks 310, 712. Distinct patterns of magnets are also an acknowledgement that drawing the purge dam assembly 1 into the pipes to be welded might well require more magnetic power to draw the distal end of the purge dam assembly 1 into the proximal pipe 6p or, in turn, to position the distal pipe 6d around the purge dam assembly 1 as it rests in place in the proximal pipe 6p. As is evident in FIG. 1, by way of non-limiting embodiment, the distal disk, the distal disk 310, receives six magnets equally spaced around the periphery, and therefore hexagonally disposed about the periphery of the disk 310. In contrast, in this embodiment, the proximal disk, the proximal disk 712 receives four such magnets equally around the periphery and therefore a disposition at each of four ninety degree orientations relative to adjacent magnets. In this manner, the greatest magnetic attraction will only be achieved when the device is properly oriented within a positioning jig. Such orientation applies not only to lateral alignment but also to rotational alignment as the purge dam assembly 1 will rotate to where both of the disks 310 and 712 are in closest proximity to the corresponding magnets in the jig which will only occur in two rotational positions separated by 180 degrees. Because of that, the distinct displacement of magnets 330, 719 along peripheries of the two disks 310 and 712 respectively.

Figure 2:
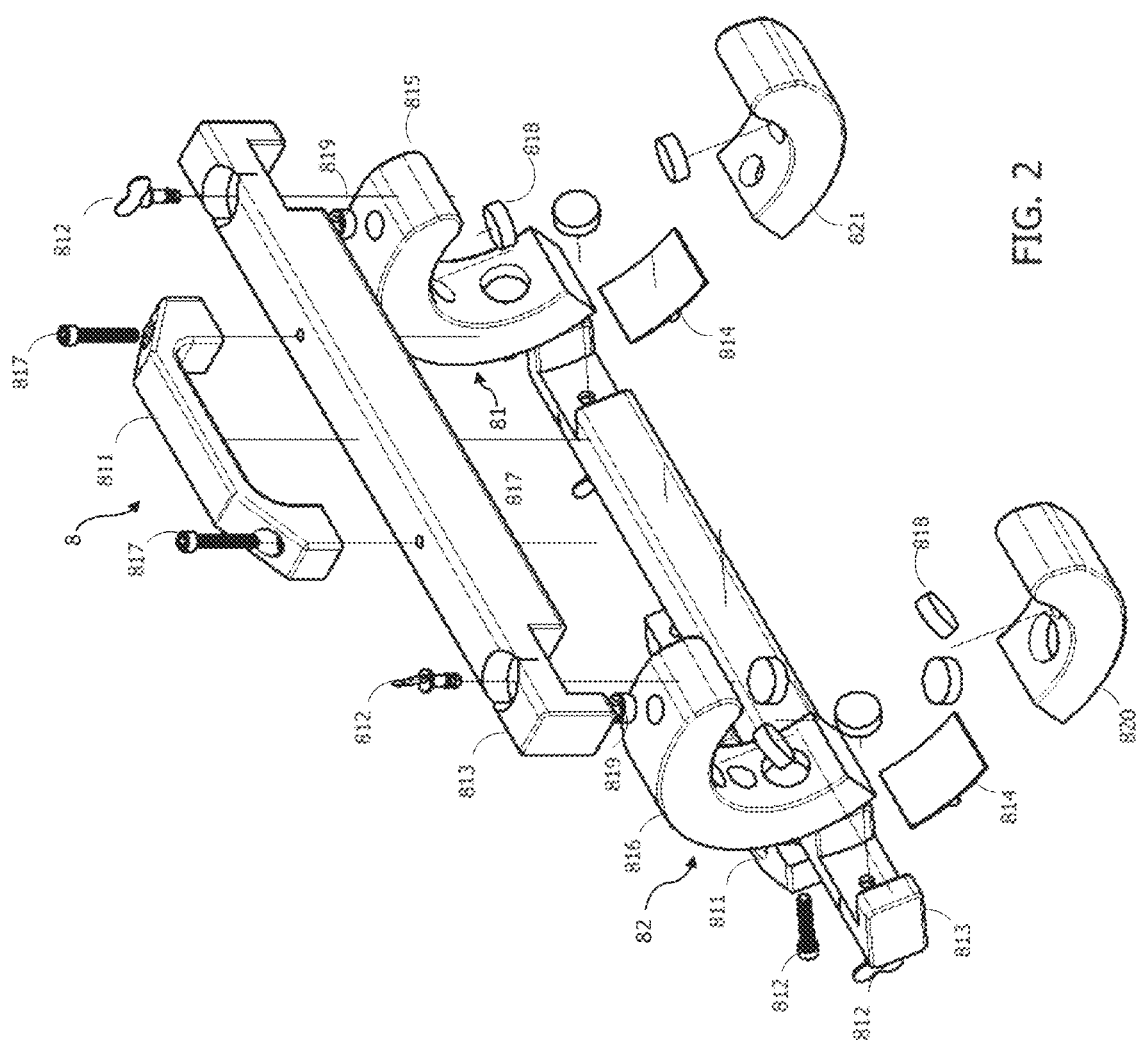
FIG. 2 is an exploded view of a jig used to place the purge dam within a pipe through magnetic attraction.
Figure 3:
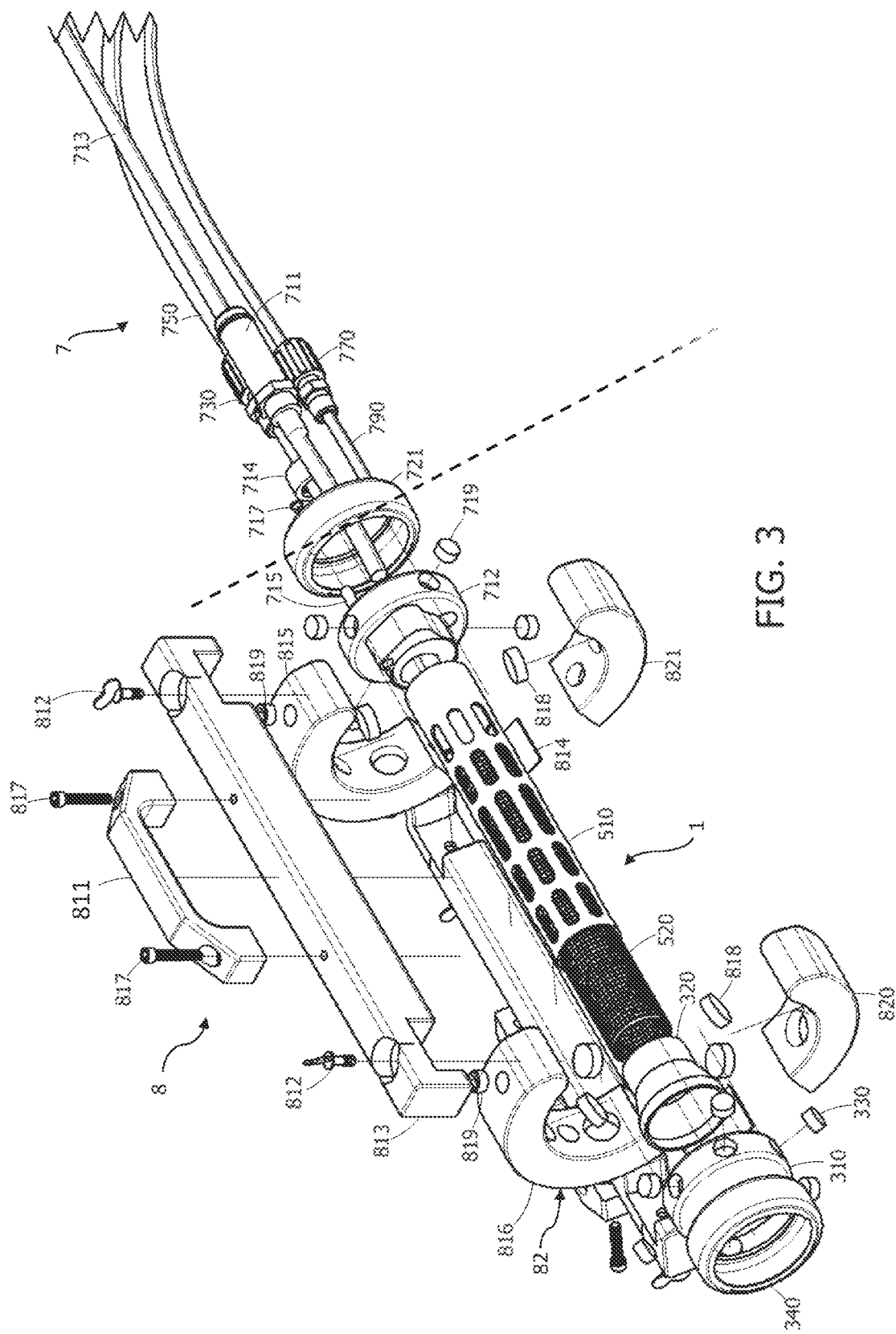
FIG. 3 is an exploded view of both of the purge dam and the jig placed in relation to demonstrate operational positions of each relative to the other.

Referring now to FIGS. 1, 2, and 3, a positioning jig 8 is depicted for manual insertion of the purge dam assembly 1 into a pair of pipes to be butt welded together. Before a further exposition of the positioning jig 8 is attempted, the reader is advised that the manual positioning jig 8 is selected for explanation because any automated jig will include many of the features and structures of the manual positioning jig 8, and will not require all of those structures such as a handle 811 substituting therefor an actuator head or some alternate structure. Nonetheless, it is the intent of the inventors to clearly describe all aspects of the jig and believe that the manual positioning jig 8 encompasses most of the novel features in a fashion that is clearly understandable. For that reason, no exposition of the automated version of the positioning jig was deemed necessary for a complete discussion of the concepts that enable either version of the positioning jig 8, automated or manual.

Examining then, the positioning jig 8, two principal elements become evident as defining the structure, the distal positioning ring 81 (comprising a distal stationary jaw 816 and a distal grasping jaw 820) and proximal positioning ring 82 (comprising a proximal stationary jaw 815 and a proximal grasping jaw 821). Arranged around an interior surface of each of the distal and proximal positioning rings are magnets 818 disposed to correspond to the positions of magnets around the periphery, i.e. the distal positioning ring 81, receives six magnets 818 equally, and therefore hexagonally disposed about the periphery of the ring 81. In contrast, in this embodiment, the proximal positioning ring 82 receives four such magnets 818 equally around the interior surface and therefore a disposition at each of four ninety degree orientations relative to adjacent magnets. Naturally poles are aligned to attract rather than to repel corresponding magnets on the periphery of the corresponding disks 310 and 712.

While in the manual embodiment of the jig, these magnets are disposed in the rings 81, 82, they can equally well be placed in grippers that encompass pipes to be welded. Encompassing grippers use fingers to cradle the workpiece, in this case, the pipe. Encompassing jaws add stability and power by cradling the workpiece. Encompassing jaws provide a major advantage, 4 to 1, in force required because the jaws must be driven open for a part to be dropped from an encompassing grip. But, for purposes of holding and aligning pipe, encompassing jaws have great utility. Importantly, because force is applied from generally every direction evenly, such grippers will not deform the pipe as gripped.

Advantageously, as well, these grippers have inner surfaces upon which can reside magnets similarly arrayed as those in the rings 81, 82 to serve identical purposes without requiring the additional structure the jig 7 entails. Thus a distal gripper (now shown) would entail recesses to receive magnets 818 in a distal stationary jaw 816 and a distal grasping jaw 820, and a proximal gripper (also not shown) would comprise a proximal stationary jaw 815 and a proximal grasping jaw 821. Naturally to perform such a task, the arraying of the magnets 818, and their orientation would necessarily exactly match those of the rings 81, 82.

Outside of the context of grippers, we return to the manual jig 8. As described above, there is the distal positioning ring 81 (comprising a distal stationary jaw 816 joined a distal grasping jaw 820 with a hinge 814, to facilitate grasping) and there is the proximal positioning ring 82 (comprising a proximal stationary jaw 815 and a proximal grasping jaw 821 also with a hinge 814, also to facilitate grasping). Each of these must remain in spatial relationship one with the other or they will not serve to locate the purge dam assembly 1 within the pipes to be welded. To maintain this spatial relationship, the proximal ring 82 is connected to the distal ring 81 using at least one registration bar 813 (shown here in its presently preferred embodiment, having two registration bars 813 to better maintain the alignment and distance between the rings 81, 82).

To fasten the rings 81, 82 to the registration bars 813, fasteners are used. In the presently preferred embodiment, male quarter-turn fasteners 812 engage female quarter-turn press fasteners which are pressed into the outer surface of the rings 81, 82 at the stationary jaws 815, 816. Quarter-turn fasteners are extremely useful to affix the registration bars 813 because their ability to rapidly and easily attach and detach the registration bars 813 to and from the rings 81, 82. In such a manner, the positioning jig 8 can be disassembled to avoid obstacles as the pipes are assembled. For example, to disassemble the jig 8 would allow a user to avoid moving stanchions that are placed to support the pipes. Thus, for example, the jig 8 can be assembled around the pipes and function without disturbing the stanchions. In fact, registration bars 813 might be selected by length in order to avoid such obstacles and, thereby, to allow construction to proceed even in the presence of obstacles.

Another reason to allow a user to select from distinct sets of registration bars 813 of varying lengths is to make those selections based upon the volume of purge gas the user wishes to confine between the distal disk 310 and the proximal disk 712. For example, colored registration bars 813 might be used to denote the act of welding pipes based upon the metallurgical properties of those pipes or upon the nature of the gas used as a purge gas. In such a manner, only an optimal amount of expensive purge gases are used in each welding instance, the volume being defined in response to these variables.

In embodiments of the manual positioning jig, 8 it has proven to be advantageous to provide handles 811 extending radially from the rings 81, 82 in order to give the user better leverage for manipulating and positioning the jig 7 relative to the pipes to be welded In positioning the jig 7, the user positions the purge dam assembly 1 within the pipes. Because they are to be permanently affixed, cap screws 817 (here depicted as Allen™-type) are advantageously used to fasten the handles 811 to the registration bars 813. In use, then, the handles 811, assist the user to manually position the jig 7 and to do so easily and rapidly for construction within the clean room environment.

Figure 4:
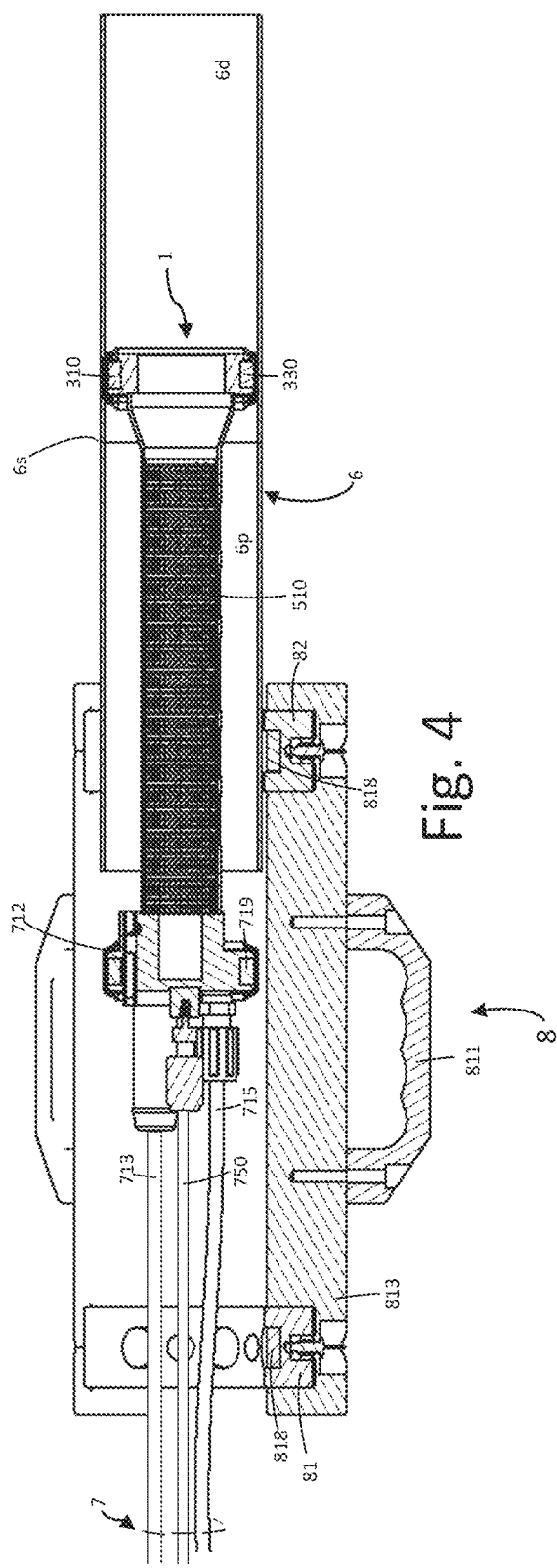
FIG. 4 is a cross-sectional view of the of both of the purge dam and the jig placed in relation to demonstrate operational positions of each relative to the other, the purge dam and jig being shown inserted into a first pipe at a position over half of the operational length of the purge dam.

A method for using the purge dam assembly 1 begins by positioning a distally located pipe 6d into axial alignment and in butted contact with a proximally located pipe 6p for welding along a seam 6s (collectively referred to as a pipe assembly 6) as is depicted in FIG. 4. Once so located, the purge dam assembly 1 is inserted into the pipe assembly such that at least the distally located distal disk 310 is within the pipe assembly 6 (often both the distal disk 310 and the proximal disk 712 will be inserted; however, for clarity, only the distal disk 310 is shown as within the pipe assembly 6). In order to prevent racking of the distal disk 310 within the pipe assembly (racking meaning to skew the purge dam assembly 1 relative to an axis of the pipe assembly), the oxygen sensor signal cable 713, the sample outlet tube 715, and the purge gas supply tube 750 are supported to align axially with the pipe assembly 6 to prevent gravity's exertion of a racking force on the distal disk 310 as contained by the pipe assembly 6.

Once suitably inserted into the pipe assembly 6, the purge dam assembly 1 must be urged into position so as to operate. For that purpose, the positioning jig 7 is placed to encompass the pipe assembly 6 and the purge dam assembly 1 within the pipe assembly 6. To accomplish this, the rings 81, 82 hang open on the hinges (not shown) until magnetic forces close the rings 81, 82 around the pipe assembly 6 based upon the attraction resulting from proximity to the above-described magnets of the purge dam assembly 1.

Figure 5:
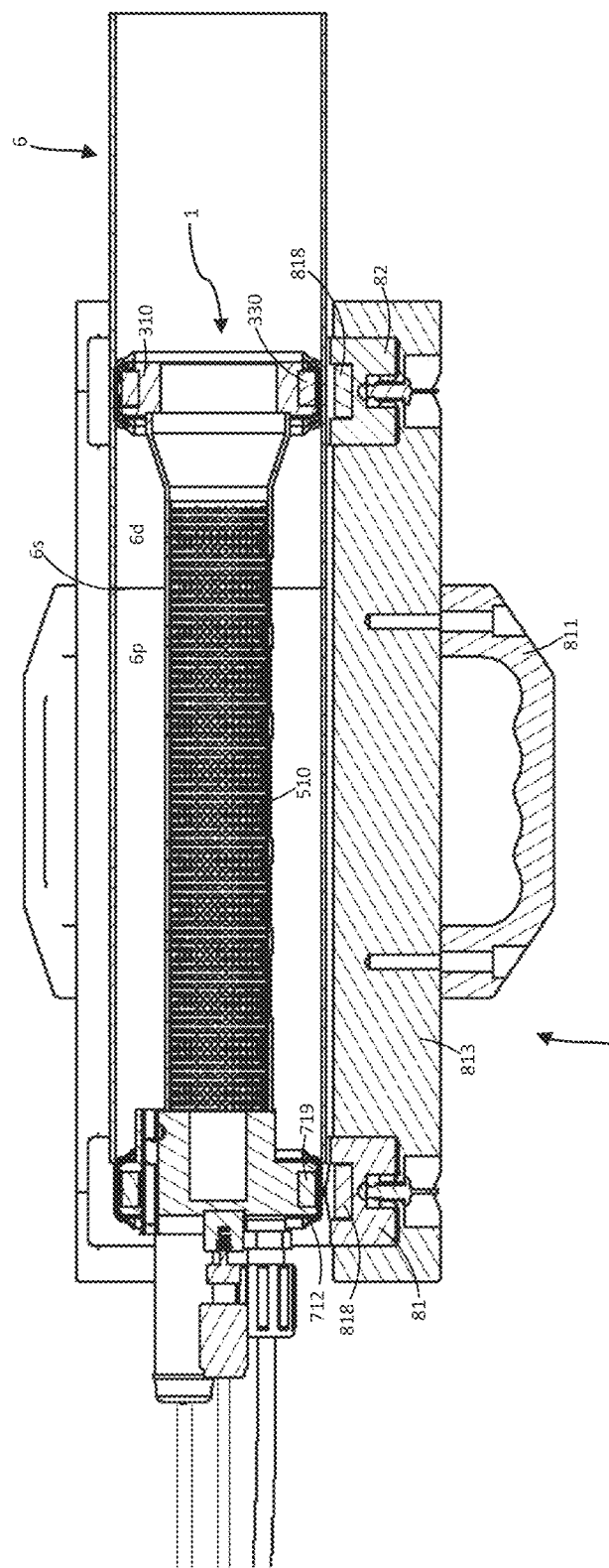
FIG. 5 is a cross-sectional view of both the purge dam and the jig placed in relation to demonstrate operational positions of each relative to the other, the purge dam and jig being shown inserted so as to extend from the first pipe into a second pipe at a position over half of the operational length of the purge dam, the first pipe and second pipe being in abutting relation.
Figure 6:
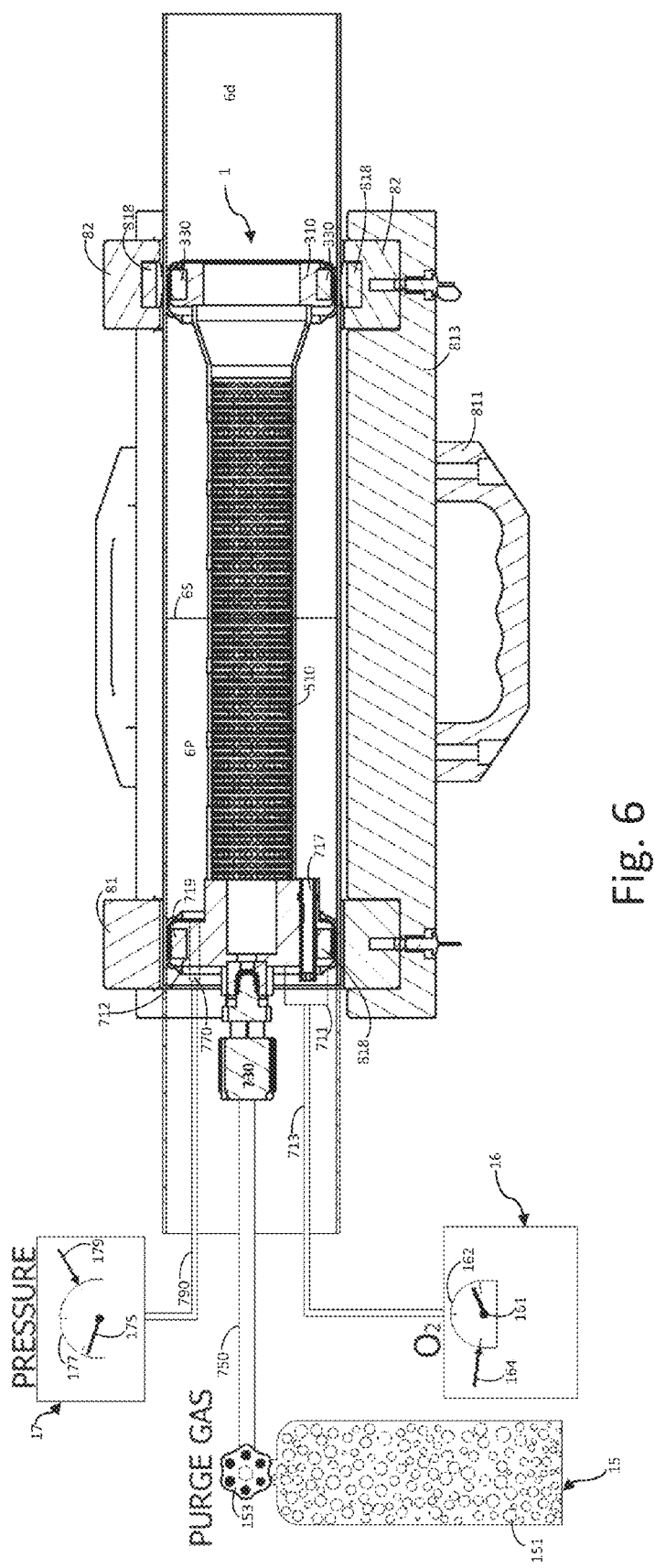
FIG. 6 is a cross-sectional view of both the purge dam and the jig placed in relation to demonstrate operational positions of each relative to the other, the purge dam and jig being shown inserted such that it spans a junction between the first pipe and second pipe at a position over half of the operational length of the purge dam, the first pipe and the second pipe being in abutting relation (also shown are a supply of purge gas, an oxygen sensor output and a pressure sensor output prior to admission of purge gas into the purge valve)

FIG. 5 shows the purge dam assembly 1 being urged into an intermediate position within the pipe assembly 6 by movement of the positioning jig 8 (shown again in the embodiment having handles 811 extending radially from the rings 81, 82). As shown, the purge dam assembly 1 extends such that the distal disk 310 has traveled past the seam 6s in the pipe assembly and rests within the interior of the distal pipe 6d while the slotted tube 510 traverses the seam 6s extending from the interior of the distal pipe 6d to the interior of the proximal pipe 6p where it is affixed to the proximal disk 712. As explained above, it is the magnetic attraction between the magnets 818 in the rings, 81, 82 of the positioning jig 7 and the magnets (330 in the distal disk 310; 719 in the proximal disk 712, the disks being rigidly coupled by the slotted tube 510) enables the movement into to the pipe assembly 6. By exerting an axial force on the handles 811 of the positioning jig 8, the rings 81, 82, separated by the registration bar 813 are drawn axially along the pipe assembly 6 to drawn, in turn, the purge dam assembly 1 into the pipe assembly 6.

Ultimately, the purge dam assembly 1 is drawn perfectly into position such that the pipe seam 6s where the distal pipe 6d abuts the proximal pipe 6p bisects the slotted tube 510. Thus both the distal disk 310 and the proximal disk 712 lie equidistant from the seam 6s and the volume of purge gas the purge dam assembly will contain will be the same so that the concentration of oxygen in the proximal pipe 6p will be the same as the concentration of oxygen in the distal pipe 6d when the purge gas valve 153 releases purge gas 151 from the purge gas bottle 15 into the slotted tube 510 to displace the atmospheric gasses including oxygen within the pipe assembly 6.

To monitor the operation of the purge dam assembly 1, the presently preferred embodiment includes two sensors, an oxygen sensor 711 and a pressure sensor (shown here as the pressure sensing assembly 17 having a pressure supply line 790). In the illustrated embodiment, gauges are shown, however, in an automated embodiment, such gauges may not be necessary as a central processor could read each of the two sensors directly and there would be no need to make the outputs from the sensors, necessarily, to be human-readable. For that reason, the invention is not limited to only the embodiment shown in the figures.

As shown, the pressure sensor assembly 17 includes a gauge face 177 and a needle 175. For clarity, as well, an operating pressure index 179 is shown. The pressure contained within the purge dam assembly 1 between the disks 310, 712 is communicated through the pressure sensing fitting 770 and continuing through the pressure supply tube to a sensor (not shown) to drive the needle 175. In the presently shown state, the needle 175 indicates a pressure at ambient.

The oxygen sensor 711 senses the presence of oxygen within the purge dam assembly 1 at the proximal disk 712. This is important because as the furthest extremity from the weld site at the seam 6s, the purge gas 151 will disperse to its location only after transiting from the slotted tube 510 and ought, in practice to give the highest reading for oxygen in the volume the two disks 310, 712 confine within the pipe assembly 6. As such, when the oxygen sensor 711 indicates appropriate levels of oxygen at the sensor 711, the oxygen concentration at the weld site is certainly appropriate. As with the pressure gauge assembly 17, a needle 161 indicates a sensed level of oxygen. the operative minimum oxygen is indicated by an oxygen index 164 and ambient concentration is shown on the face 162 in current state.

Figure 7:
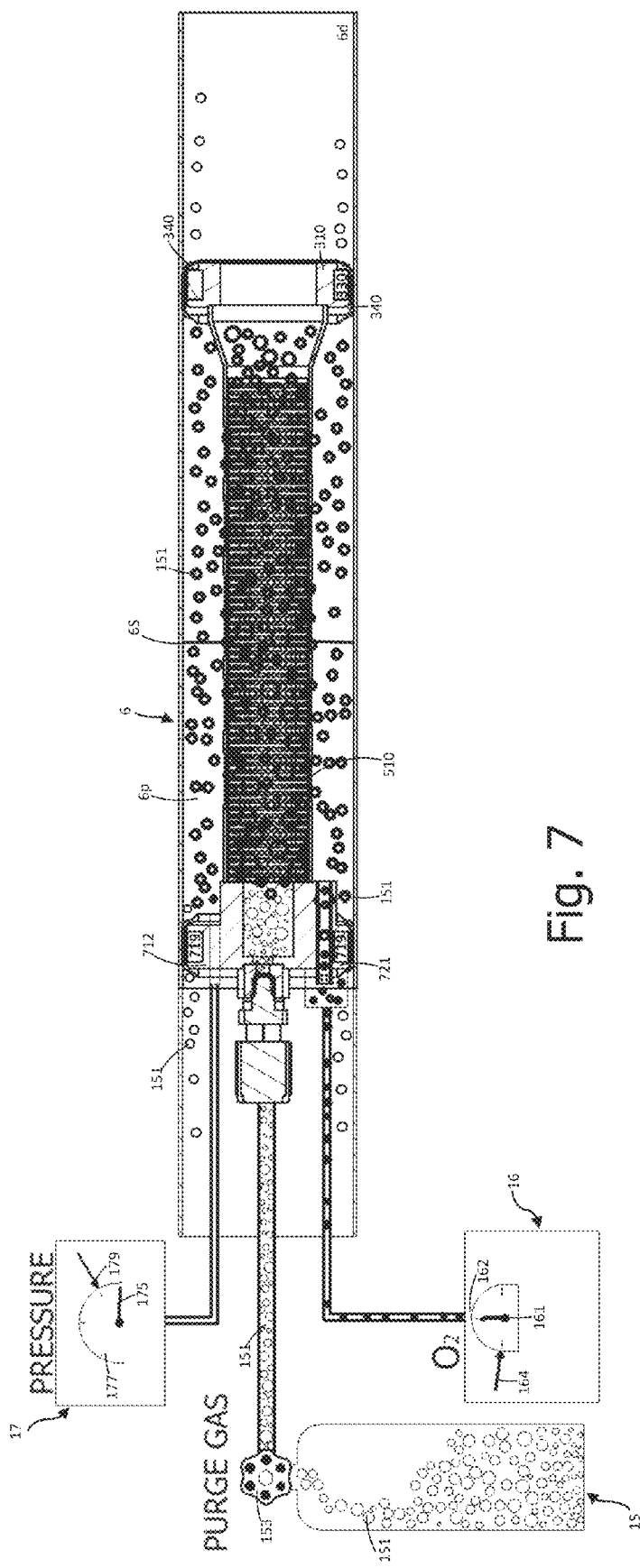
FIG. 7 is a cross-sectional view of both the purge dam and the jig placed in relation to demonstrate operational positions of each relative to the other, the purge dam and jig being shown inserted such that it spans a junction between the first pipe and second pipe at a position over half of the operational length of the purge dam the first pipe and the second pipe being in abutting relation (also shown are a supply of purge gas, an oxygen sensor output and a pressure sensor output at a moment during the admission of purge gas into the purge valve)

In FIG. 7, the purge dam assembly 1 is shown after the removal of the positioning jig 8 and remains as the positioning jig 8 has placed it. As depicted, the purge gas valve 153 is opened allowing purge gas 151 to flow into the slotted tube 510 to disperse between the proximal disk 712 and the distal disk 310, within the pipe assembly 6. The valve is initially opened, in the illustrated embodiment, to admit the purge gas 151 at a slight over pressure to rapidly fill the volume the two disks 310, 712 confine within the pipe assembly 6. The pressure sensor assembly 17 indicates the slight and momentary overpressure used to achieving the purging of atmospheric gas from that volume. In the manually purged embodiments of the purge dam assembly 1, an operator can, by monitoring the oxygen sensor assembly 16, time the adjustment of the valve 153, to assure that a minimum of purge gas 151 is distributed to the ambient atmosphere as might be necessary to displace sufficient oxygen to assure an appropriate weld at the seam 6s.

As is shown in FIG. 7, the purge gas 151 introduced into the volume the two disks 310, 712 confine within the pipe assembly 6, increases the pressure and as such, drives the atmospheric gasses including oxygen out of the volume as the purge gas displaces those gasses. When under pressure, the combination of atmospheric gasses and purge gasses 151 escapes through the seam 6s driving oxygen from the immediate proximity to the seam 6 at the exterior of the pipe assembly 6. Additionally, the gasses vent around the periphery of each of the distal disk 310 and the proximal disk 712. In embodiments of the purge dam assembly 1, the socks 340, 721 facilitate escape through voids within the textile which the socks 340, 721 comprise. Inherent in the structure of the textile the socks 340, 721 comprise are such voids running between the fibers of the textile. The physical properties of the nonwoven textiles depend of the nature of the filament or the fibers: their chemical composition, their morphological properties and of the organization of the fabric structure. This structure depends of the manufacturing processes (i.e.: spun, carded, air or water laid processes either consolidated by polymer latex, thermofusing or needling). The characterization of the fabric structure by means of quantified parameters is therefore essential for the control of the fabrication processes and the resulting properties of the nonwoven materials. Important parameters of the structure are the porosity (the mean pore size and the pore size distribution), the specific area of the texture, and the fibers orientation with the last one being characterized in the three dimensions of the fabric web. These pores facilitate the venting of the combination of purging gas 151 and atmospheric gasses by the centering forces the socks 340, 721 exerts along the periphery of each disk 310, 712 on the interior of, in turn, the distal pipe 6d and the proximal pipe 6p. Qualities of the textile the socks 340, 721 comprise can be selected to optimize the flow of gasses relative to the flow through the seam 6p. Such selections, however, only optimize and are not necessary to enable the function of the purge dam assembly 1.

Figure 8:
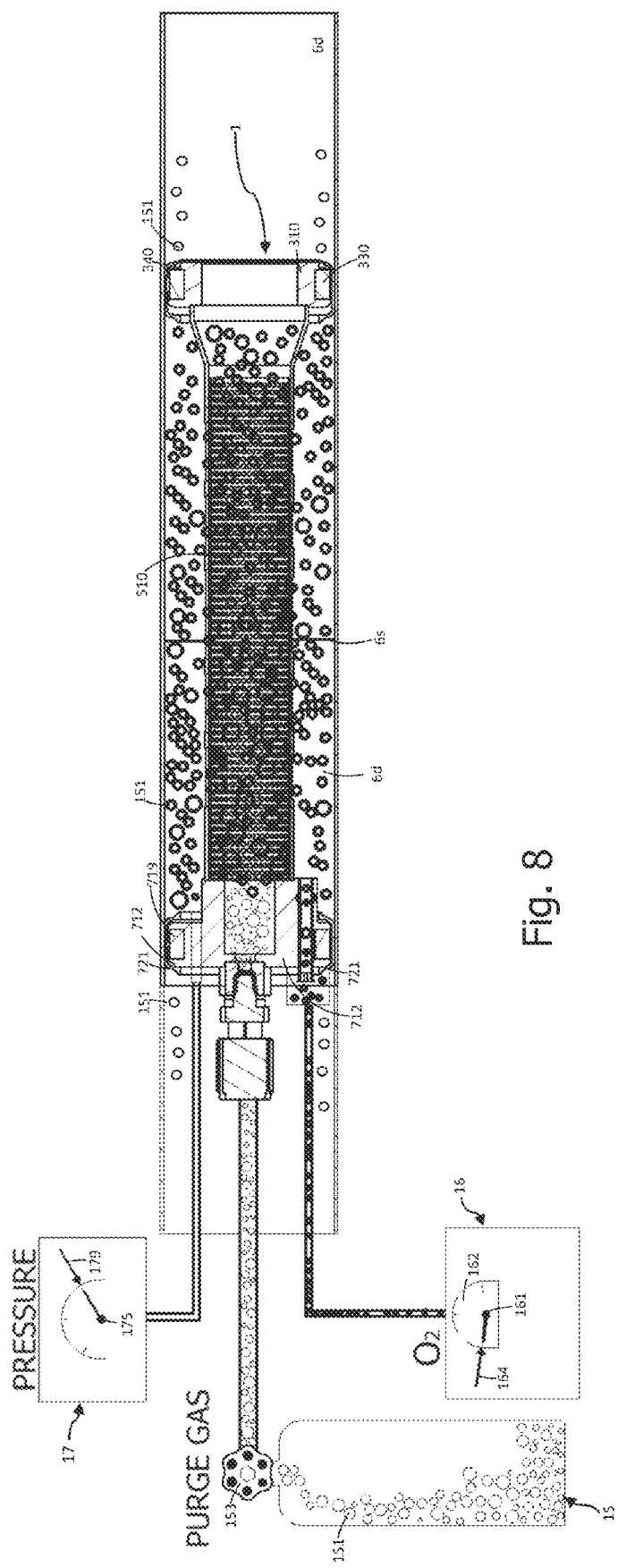
FIG. 8 is a cross-sectional view of both the purge dam and the jig placed in relation to demonstrate operational positions of each relative to the other, the purge dam and jig being shown inserted such that it spans a junction between the first pipe and second pipe at a position over half of the operational length of the purge dam the first pipe and the second pipe being in abutting relation (also shown are a supply of purge gas, an oxygen sensor output and a pressure sensor output at a moment when the admission of purge gas into the purge valve has suitably purged the junction between the first pipe and the second pipe)

FIG. 8 shows the equilibrium achieved just prior to welding along the seam 6s formed by the distal pipe 6d as it abuts the proximal pipe 6p. As shown, purge gas 151 continues to vent through the socks 340, 721. The purge dam assembly 1 remains suitably positioned within the pipe assembly 6 and the oxygen concentration is shown to be appropriate as indicated on the oxygen sensor assembly 16 (note the position of the needle 161 relative to the oxygen index 164) and the pressure is likewise appropriate as indicated on the pressure sensor assembly 17 (and note the position of the needle 175 indicating the pressure at the pressure index 179).

Figure 9:
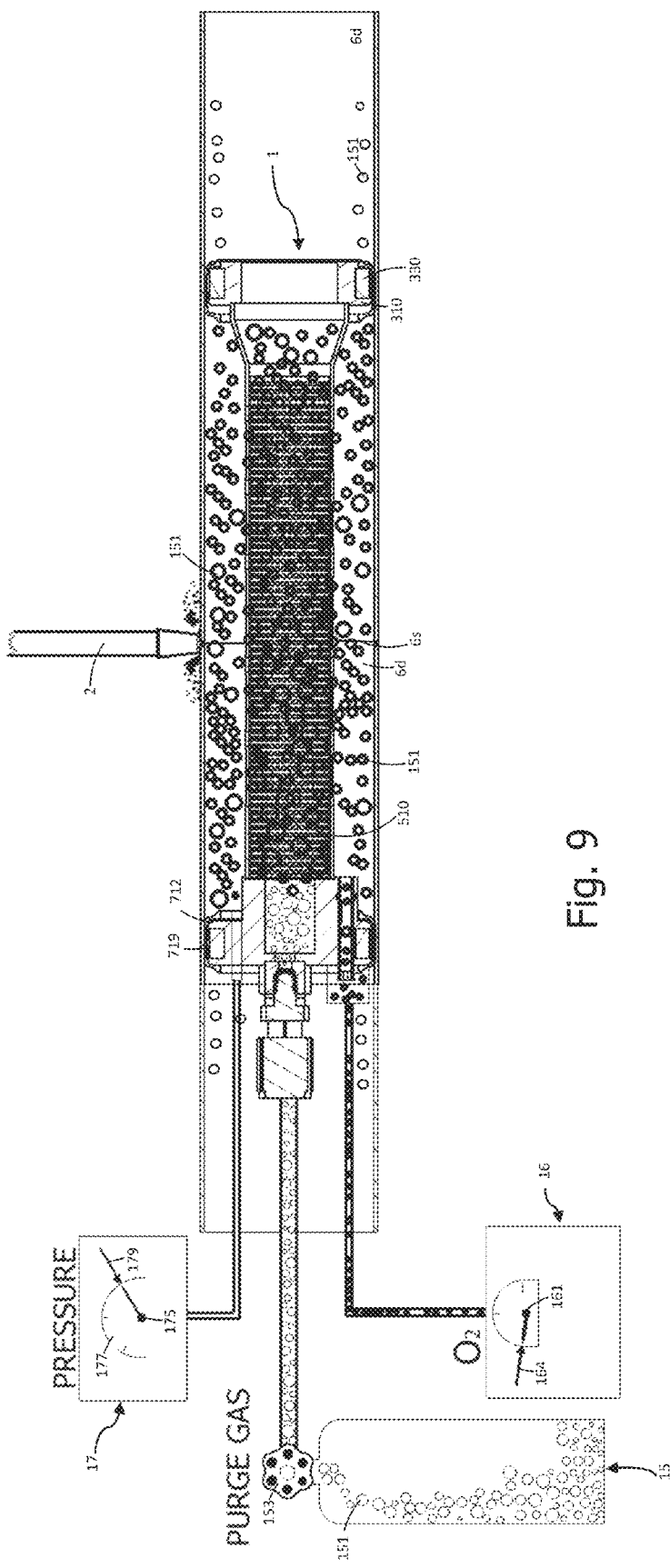
FIG. 9 is a cross-sectional view of both the purge dam and the jig placed in relation to demonstrate operational positions of each relative to the other at a moment when the pipes are being joined by welding, the purge dam and jig being shown inserted such that it spans a junction between the first pipe and second pipe at a position over half of the operational length of the purge dam the first pipe and the second pipe being in abutting relation (also shown are a supply of purge gas, an oxygen sensor output and a pressure sensor output at a moment when the admission of purge gas into the purge valve has suitably purged the junction between the first pipe and the second pipe).

FIG. 9 shows, identically to FIG. 8 with the purge dam assembly 1 suitably positioned within the pipe assembly 6. Additionally, however, the welding device 2 is shown in the course of welding the distal pipe 6d to the proximal pipe 6p. Notably, the oxygen concentration remains appropriate as indicated on the oxygen sensor assembly 16 (again, note the position of the needle 161 relative to the oxygen index 164) and the pressure likewise remains appropriate as indicated on the pressure sensor assembly 17 (and, again, note the position of the needle 175 indicating the pressure at the pressure index 179). As stated above, the further flow of purge gas 151, through the seam 6s, small though it might be, ensures sound welds at the seam 6s.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A purge dam assembly for confining a volume within an assembly of pipes, including a distal pipe and a proximal pipe together arranged for butt welding at a seam, comprises:
   a distal disk, the distal disk being covered at its periphery with a distal sock, the sock being a tubular pipe comprising a gasketing material, the gasketing material comprising a synthetic textile having a filament sufficiently soft to contact an electropolished surface without significantly scratching that surface, the distal disk being sized such that the distal sock contacts but does not completely seal against an inner surface of the distal pipe permitting a purging flow of purge gas from the volume and past the distal disk when the purge disk assembly is inserted into the assembly of tubes or pipes;
   a proximal disk, the proximal disk being covered at its periphery with a proximal sock comprising the gasketing material, the proximal disk defining a purge gas portal for admitting of a purging flow of purge gas into the volume and, further, being sized such that the proximal sock contacts but does not completely seal against an inner surface of the proximal pipe permitting a purging flow of purge gas from the volume and past the distal disk; and
   a cross-member having a proximal and a distal end, the proximal end being affixed to the proximal disk and the distal end being affixed to the distal disk in a manner to preserve the spatial separation between the proximal disk and distal disk and to maintain the proximal and distal disks in coaxial alignment; and
   the purge dam assembly further comprising:
   a positioning jig including each of a distal ring and a proximal ring, the distal and proximal rings including magnets mounted at intervals around an internal surface of the rings; and
   wherein each of the proximal disk and the distal disk have magnets embedded within the periphery;
   such that movement of each of the distal and the proximal rings along an exterior surface of the pipe assembly will urge the proximal disk, the distal disk, and with them, the cross-member along the inner surface of the pipe assembly in a manner corresponding to the movement of the rings.

2. The purge dam assembly of claim 1, wherein the proximal disk defines:
   an oxygen sensor portal for receiving an oxygen sensor, the oxygen sensor configured to monitor the presence of oxygen within the volume when the purge dam assembly is positioned within the assembly of pipes.

3. The purge dam assembly of claim 1, wherein the proximal disk defines:
   a borescope portal for receiving a borescope, the borescope being positioned within the assembly of pipes to facilitate inspection of a weld at the seam.

4. The purge dam assembly of claim 1, wherein the proximal disk defines:
   a pressure sensing portal to communicate between the volume and a pressure sensor to enable the pressure sensor to indicate pressure the purge dam assembly contains within the volume.

5. The purge dam assembly of claim 1, wherein:
the cross-member is a tube that is perforated to diffuse purging gas flowing from an interior of the tube through the perforations to an exterior of the tube within the volume; and
the purge gas portal is positioned to admit purge gas into the interior of the tube, initiating a flow of purge gas through the perforations.

6. The purge dam assembly of claim 5, wherein the tube is perforated with slots that are arranged to be elongate along axes parallel to a major axis of the tube.

7. A method for purging oxygen from a volume a purge dam assembly confines within an assembly of pipes, including a distal pipe and a proximal pipe together arranged for butt welding at a seam, comprises:
selecting a purge dam assembly for insertion into the pipe assembly, the purge dam assembly including:
a distal disk, the distal disk being covered at its periphery with a distal sock, the sock being a tubular pipe comprising a gasketing material, the gasketing material comprising a synthetic textile having a filament sufficiently soft to contact an electropolished surface without significantly scratching that surface, the distal disk being sized such that the distal sock contacts but does not completely seal against an inner surface of the distal pipe permitting a purging flow of gas from the volume and past the distal disk when the purge disk assembly is inserted into the assembly of tubes or pipes;
a proximal disk, the proximal disk being covered at its periphery with a proximal sock comprising the gasketing material, the proximal disk defining a purge gas portal for admitting of a purging flow of purge gas into the volume and, further, being sized such that the proximal sock contacts but does not completely seal against an inner surface of the proximal pipe permitting a purging flow of purge gas from the volume and past the distal disk; and
a cross-member having a proximal and a distal end, the proximal end being affixed to the proximal disk and the distal end being affixed to the distal disk in a manner to preserve the spatial separation between the proximal disk and distal disk and to maintain the proximal and distal disks in coaxial alignment;
moving each of a distal and a proximal ring of a positioning jig along an exterior surface of the pipe assembly will urge the proximal disk, the distal disk, and with them, the cross-member along the pipe assembly in a manner corresponding to the movement of the rings, the positioning jig including:
each of a distal and a proximal ring, the distal and proximal rings including magnets mounted at intervals around an internal surface of the rings;
wherein each of the proximal disk and the distal disk have magnets embedded within the periphery and
inserting the purge dam assembly into the pipe assembly to occupy a position such that a plane the seam in the pipe assembly defines generally bisects the cross-member.

8. The method of claim 7 further comprising:
inserting an oxygen sensor into an oxygen sensor portal the proximal disk defines, the oxygen sensor configured to monitor the presence of oxygen within the volume when the purge dam assembly is positioned within the assembly of pipes.

9. The method of claim 7 further comprising:
inserting a borescope into a borescope portal, the borescope, when inserted residing at a position within the assembly of pipes to facilitate inspection of a weld at the seam.

10. The method of claim 7, further comprising:
sensing pressure the purge dam assembly contains within the volume at a pressure sensing portal the proximal disk defines.

11. The method of claim 7, further comprising:
admitting a purging gas into the volume through the purge gas portal wherein:
the cross-member is a tube that is perforated to diffuse purging gas flowing from an interior of the tube through the perforations to an exterior of the tube within the volume; and
the purge gas portal is positioned to admit purge gas into the interior of the tube initiating a flow of purge gas through the perforations.

12. The method of claim 11, wherein the tube the perforations are slots that are arranged to be elongate along axes parallel to a major axis of the tube.

13. A method for purging oxygen from a volume a purge dam assembly confines within an assembly of pipes, including a distal pipe and a proximal pipe together arranged for butt welding at a seam, comprises:
covering a periphery of a distal disk with a distal sock, the sock being a tubular pipe comprising a gasketing material, the gasketing material comprising a synthetic textile having a filament sufficiently soft to contact an electropolished surface without significantly scratching that surface, the distal disk being sized such that the distal sock contacts but does not completely seal against an inner surface of the distal pipe permitting a purging flow of gas from the volume and past the distal disk when the purge disk assembly is inserted into the assembly of tubes or pipes;
covering a periphery of a proximal disk with a proximal sock comprising the gasketing material, the proximal disk defining a purge gas portal for admitting of a purging flow of purge gas into the volume and, further, being sized such that the proximal sock contacts but does not completely seal against an inner surface of the proximal pipe permitting a purging flow of purge gas from the volume and past the distal disk;
affixing a distal disk to a perforated tube at a distal end of the perforated tube, the perforated tube having each of a proximal and the distal end;
affixing a proximal disk to a slotted tube in a manner to preserve the spatial separation between the proximal disk and distal disk and to maintain the proximal and distal disks in coaxial alignment;
moving each of a distal and a proximal ring of a positioning jig along an exterior surface of the pipe assembly will urge the proximal disk, the distal disk, and with them, the cross-member along the pipe assembly in a manner corresponding to the movement of the rings, the positioning jig including:
each of a distal and a proximal ring, the distal and proximal rings including magnets mounted at intervals around an internal surface of the rings; and
wherein each of the proximal disk and the distal disk have magnets embedded within the periphery.

14. The consmethod of claim 13 further comprising:
inserting an oxygen sensor into an oxygen sensor portal the proximal disk defines, the oxygen sensor configured to monitor the presence of oxygen within the volume when the purge dam assembly is positioned within the assembly of pipes.

15. The method of claim 13 further comprising:

inserting a borescope into a borescope portal, the borescope, when inserted residing at a position within the assembly of pipes to facilitate inspection of a weld at the seam.

16. The method of claim 13, further comprising:

sensing pressure the purge dam assembly contains within the volume at a pressure sensing portal the proximal disk defines.

17. The method of claim 13, further comprising:

admitting a purging gas into the volume through the purge gas portal wherein:

the cross-member is a tube that is perforated to diffuse purging gas flowing from an interior of the tube through the perforations to an exterior of the tube within the volume; and the purge gas portal is positioned to admit purge gas into the interior of the tube initiating a flow of purge gas through the perforations.

* * * * *

UNITED STATES PATENT AND TRADEMARK OFFICE
CERTIFICATE OF CORRECTION

PATENT NO. : 9,586,284 B2  
APPLICATION NO. : 14/489333  
DATED : March 7, 2017  
INVENTOR(S) : Coke Evans, Ralph M. Cohen and Richard Bottorff Page 1 of 1

It is certified that error appears in the above-identified patent and that said Letters Patent is hereby corrected as shown below:

In the Claims

Column 16, Line 65, Claim 14, delete "consmethod" and insert --method--.

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*